United States Patent
Ardo et al.

(10) Patent No.: US 10,643,443 B2
(45) Date of Patent: May 5, 2020

(54) ALARM MASKING BASED ON GAZE IN VIDEO MANAGEMENT SYSTEM

(71) Applicant: Axis AB, Lund (SE)

(72) Inventors: Bjorn Ardo, Lund (SE); Fredrik Pihl, Malmo (SE)

(73) Assignee: Axis AB, Lund (SE)

( * ) Notice: Subject to any disclaimer, the term of this patent is extended or adjusted under 35 U.S.C. 154(b) by 78 days.

(21) Appl. No.: 15/395,403

(22) Filed: Dec. 30, 2016

(65) Prior Publication Data

US 2018/0190090 A1  Jul. 5, 2018

(51) Int. Cl.
G08B 13/196 (2006.01)
G06F 3/01 (2006.01)

(52) U.S. Cl.
CPC ....... *G08B 13/19691* (2013.01); *G06F 3/013* (2013.01); *G08B 13/19669* (2013.01); *G08B 13/19682* (2013.01)

(58) Field of Classification Search
None
See application file for complete search history.

(56) References Cited

U.S. PATENT DOCUMENTS

| | | | |
|---|---|---|---|
| 4,513,317 A | 4/1985 | Ruoff, Jr. | |
| 5,703,637 A | 12/1997 | Miyazaki et al. | |
| 6,717,607 B1 | 4/2004 | Lauper et al. | |
| 9,256,071 B1 * | 2/2016 | Spitzer | G02B 27/017 |
| 9,955,318 B1 * | 4/2018 | Scheper | H04W 4/043 |
| 2007/0237358 A1 | 10/2007 | Tseng et al. | |
| 2008/0147488 A1 * | 6/2008 | Tunick | G06Q 30/02 705/7.29 |
| 2013/0083003 A1 * | 4/2013 | Perez | G06F 3/005 345/419 |
| 2015/0036736 A1 | 2/2015 | Lundberg | |
| 2016/0267759 A1 * | 9/2016 | Kerzner | G08B 13/19645 |

FOREIGN PATENT DOCUMENTS

WO  2016145443 A1  9/2016

OTHER PUBLICATIONS

Extended European Search Report issued in corresponding European Application No. 17154583.3 dated Aug. 7, 2017, 13 pages.
"This is Eye Tracking," Tobii Group, <http://www.tobii.com/group/about/this-is-eye-tracking/>, accessed Dec. 29, 2016.

(Continued)

*Primary Examiner* — Chikaodili E Anyikire
(74) *Attorney, Agent, or Firm* — Snyder, Clark, Lesch & Chung, LLP

(57) ABSTRACT

A method and system for monitoring video data based on gaze is disclosed. The method may include receiving a video stream generated by a camera and presenting the received video stream on a display. The method may further include receiving a notification signal triggered by an event and determining that the video stream is associated with the notification signal. The method may further include detecting a gaze point of an operator viewing the display and determining at least one parameter associated with the gaze point. The method may include controlling a state of an alarm associated with the notification signal based upon the at least one parameter associated with the gaze point.

22 Claims, 9 Drawing Sheets

(56) References Cited

OTHER PUBLICATIONS

Robillard, Julie, "How to Create a Heatmap," Gazepoint, <http://www.gazept.com/faq-items/heatmap/>, Jan. 1, 2014, accessed Dec. 29, 2016.
"Video compression picture types," Wikipedia, <https://en.wikipedia.org/wiki/Video_compression_picture_types>, accessed Dec. 29, 2016.

* cited by examiner

CAMERA 110
MOTION DETECTOR 111-1
SMOKE DETECTOR 112-1

SENSOR LOGIC
670

VMS
150

RULE ENGINE
678

RULE TABLE
684

STATION 125
EYE TRACKER 140
DISPLAY 130

CAMERA MONITORING
LOGIC
676

ALARM MASKING
LOGIC
682

EYE-TRACKER LOGIC
680

MASKING TABLE
686

GAZE HISTORY
688

STREAM LOCATION
TABLE
689

RULE TABLE 684

| EVENT 702 | ACTION 704 | |
|---|---|---|
| MOTION DETECTED AT CAMERA 110-1 | NOTIFICATION: "MOTION ALERT IN AREA 106-1" TO STATION SHOWING CAMERA 110-1 | 710-1 |
| MOTION DETECTED AT DETECTOR 111-1 | NOTIFICATION: "MOTION ALERT IN AREA 106-1" TO STATION SHOWING CAMERA 110-1 | 710-2 |
| SMOKE DETECTED AT DETECTOR 112-1 | NOTIFICATION: "SMOKE ALERT IN AREA 106-1" TO STATION SHOWING CAMERA 110-1 | 710-2 |

MASKING TABLE 686

| NOTIFICATION 750 | VIDEO STREAM 752 | ACTION 754 | |
|---|---|---|---|
| MOTION ALERT IN AREA 106-1 | VIDEO STREAM FROM CAMERA 110-1 | CANCEL ALERT | 760-1 |
| SMOKE ALERT IN AREA 106-1 | VIDEO STREAM FROM CAMERA 110-1 OR CAMERA 110-2 | PAUSE ALERT | 760-2 |
| DOOR OPENED IN AREA 106-1 | VIDEO STREAM FROM CAMERA 110-1 | MASK & ACK ALERT | 760-3 |

STREAM LOCATION TABLE 689

| VIDEO STREAM 792 | LOCATION 794 |
|---|---|
| VIDEO STREAM FROM CAMERA 110-1 | UPPER-LEFT FRAME 520-1 OF DISPLAY 130-1 | 
| VIDEO STREAM FROM CAMERA 110-2 | FRAME 520-2 OF DISPLAY 130-1 |

⋮

ALARM MASKING BASED ON GAZE IN VIDEO MANAGEMENT SYSTEM

BACKGROUND

In a video management system, an operator (e.g., a security guard) may view many different video streams covering many different monitored areas. In addition to monitoring video streams, the operator may also be responsible to responding to alerts associated with events occurring in those monitored areas. For example, a monitored areas may have temperature sensors, motion detectors, tilt sensors, arrival sensors, presence sensors, door open/closed sensors, light sensors, etc. The operator may be alerted to motion in a monitored area, for example, and may be asked to acknowledge the alert. The operator may be alerted to a door-open condition and be asked to acknowledge the alert. Other sensors may likewise generate alerts and require acknowledgment by the operator.

SUMMARY

In one embodiment, a method is disclosed for monitoring video data based on gaze sensing. The method may include receiving a video stream generated by a camera and presenting the received video stream on a display and receiving a notification signal triggered by an event. The method may include determining that the video stream is associated with the notification signal, and determining a gaze point of an operator viewing the display. The method may include determining at least one parameter associated with the gaze point, and controlling a state of an alarm associated with the notification signal based upon the at least one parameter associated with the gaze point.

In one embodiment, receiving a notification signal triggered by an event may further include receiving the notification signal from a sensor that is independent from the camera. The sensor may include at least one of a proximity sensor, an intrusion sensor, a smoke sensor, a heat sensor, a pressure sensor, a motion sensor, a radar sensor, or a radiation sensor.

In one embodiment, receiving a notification signal triggered by an event may further include detecting an object in the received video stream to determine whether to generate the notification based on the event. The event may include at least one of movement of the object, the object entering a field of view of the camera, an object leaving the field of view of the camera, recognizing that the object belongs to a particular class of physical objects, or recognizing that the object is a face of a particular person.

In one embodiment, the method may include determining that the gaze point tracks the object in the video stream for a period of time exceeding a predetermined threshold.

In one embodiment, determining at least one parameter associated with the gaze point may include determining that a location of the gaze point on the display coincides with the presented video stream for a period of time. In one embodiment, controlling a state of an alarm associated with the notification signal may include deactivating a currently active alarm. In one embodiment, controlling a state of an alarm associated with the notification signal may include preventing an inactive alarm from activating. In one embodiment, controlling the state of the alarm associated with the notification signal may include automatically acknowledging the alarm on behalf of the operator. In one embodiment, controlling the state of the alarm associated with the notification signal may include changing a visual presentation or an audio presentation of the alarm to be less conspicuous.

In one embodiment, the method may include initiating automatically a recording of the received video stream in response to determining that a location of the gaze point on the display coincides with the presented video stream for a period of time.

In one embodiment, a system for monitoring video data based on gaze sensing is disclosed. The system may include a receiver to receive a video stream generated by a camera and to receive a notification signal triggered by an event, and a display to present the received video stream on the display. The system may include a processor to determine that the video stream is associated with the notification signal. The processor may be configured to receive, from an eye tracker configured to detect a gaze point of an operator viewing the display, at least one parameter associated with the gaze point. The processor may be further configured to control a state of an alarm associated with the notification signal based upon the at least one parameter associated with the gaze point.

In one embodiment, the notification signal may be generated by a sensor that is independent from the camera. The system may include at least one of a proximity sensor, an intrusion sensor, a smoke sensor, a heat sensor, a pressure sensor, a motion sensor, a radar sensor, or a radiation sensor.

In one embodiment, the system include the camera. The camera may be configured to detect an object in the received video stream to determine whether to generate the notification based on the event. The event may include at least one of movement of the object, the object entering a field of view of the camera, an object leaving the field of view of the camera, recognizing that the object belongs to a particular class of physical objects, or recognizing that the object is a face of a particular person.

In one embodiment, the system may include the eye tracker. The eye tracker may be configured to determine that the gaze point tracks the object in the video stream for a period of time exceeding a predetermined threshold.

In one embodiment, the system may include the eye tracker. The eye tracker may be configured to determine that a location of the gaze point on the display coincides with the presented video stream for a period of time.

In one embodiment, the processor may be configured to control the state of the alarm by deactivating a currently active alarm. In another embodiment, the processor is configured to control the state of the alarm by preventing an inactive alarm from activating. In another embodiment, the processor is configured to control the state of the alarm by automatically acknowledging the alarm on behalf of the operator.

In one embodiment, the processor is configured to control the state of the alarm by changing a visual presentation or an audio presentation of the alarm to be less conspicuous. In one embodiment, the processor is configured to initiate an automatic recording of the received video stream in response to determining that the location of the gaze point on the display coincides with the presented video stream for a period of time.

BRIEF DESCRIPTION OF THE DRAWINGS

FIG. 7A illustrates an exemplary event rule table in one embodiment;

FIG. 7B illustrates an exemplary masking table in one embodiment;

DETAILED DESCRIPTION

The following detailed description refers to the accompanying drawings. The same reference numbers in different drawings identify the same or similar elements.

As noted above, an operator of a video management system may view many different video streams covering many different monitored areas. Because of the proliferating sensors, an operator may be alerted to an ever increasing number of alerts, ranging from motion alerts, door-open condition alerts, temperature alerts, etc. The operator may be required to respond to all the alerts and can quickly become overwhelmed.

A video monitoring system described below may automatically mask an alert provided to an operator based on the operator's gaze. For example, if an operator is viewing the video stream from an area in which a motion notification has been issued, the associated alarm may be silenced automatically based on the fact that the operator is already viewing the video stream from the area that generated the alert. As another example, the alarm may be masked (e.g., prevented from sounding) based on the fact that the operator is already viewing the video stream from the area that generated the alert. In one embodiment, an operator may acknowledge an alert by gazing at the correct video stream. As used herein, the term "alert" is synonymous with the term "alarm."

Figure 1:
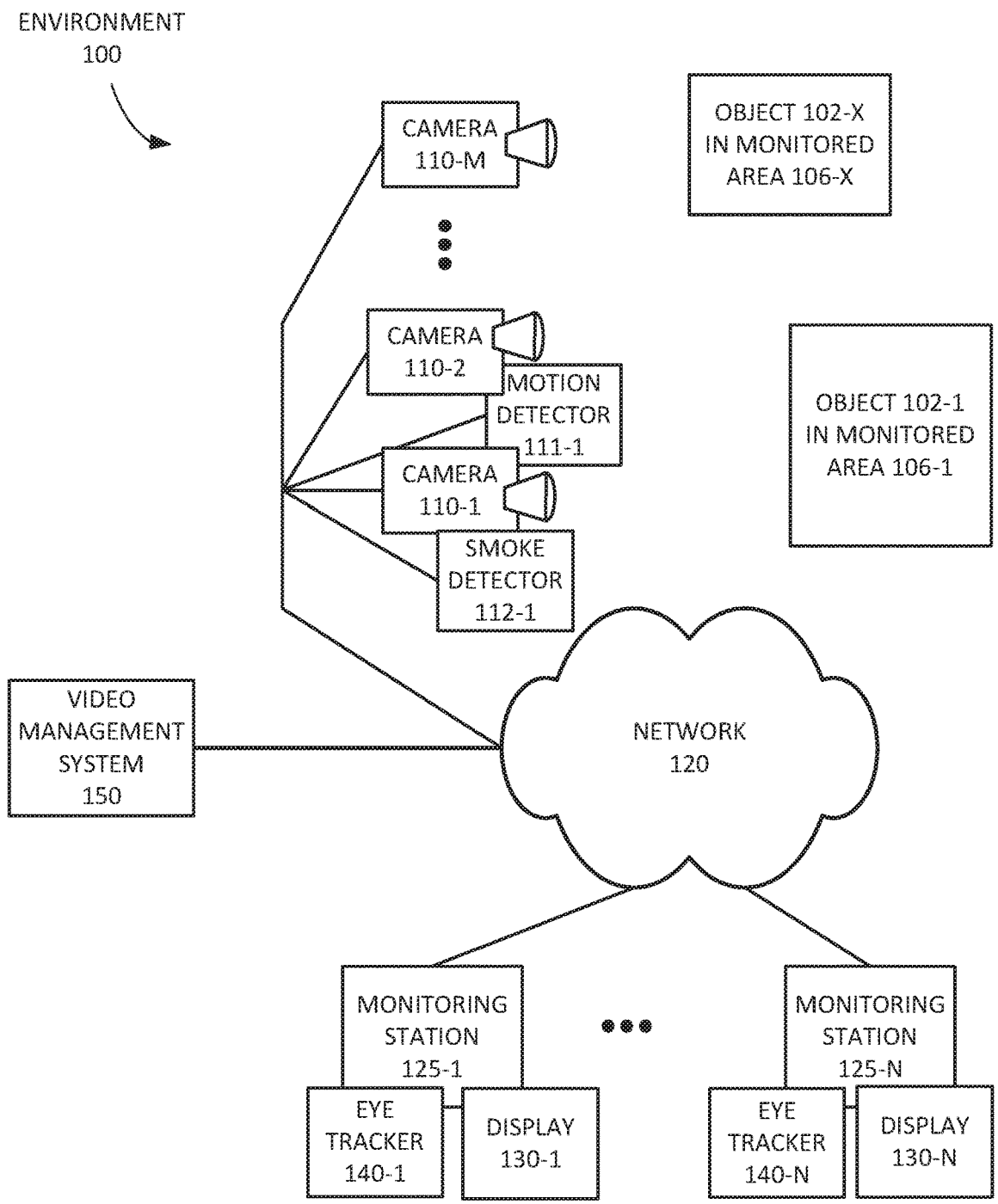
FIG. 1 is a block diagram illustrating an exemplary environment including eye tracking in one embodiment.

FIG. 1 is a block diagram illustrating an exemplary environment 100 in one embodiment. Environment 100 may be, for example, a monitoring system to secure an area or provide public safety. As shown in FIG. 1, environment 100 may include cameras 110-1 through 110-M, network 120, a video management system (VMS) 150, monitoring stations 125-1 through 125-N, eye trackers 140-1 through 140-N, and/or displays 130-1 through 130-N. Environment 100 may also include a motion detector 111-1 and a smoke detector 112-1.

Cameras 110-1 through 110-M (singular "camera 110," or plural "cameras 110") capture images and/or video of monitored areas 106. A monitored area 106 may be monitored by one or more cameras 110. For example, camera 110-1 and camera 110-2 monitor area 106-1, which includes an object 102-1. Objects 102 may include any object discernable in the video stream, such as, for example, a door, a person, an animal, a vehicle, a license plate on a vehicle, etc.

Camera 110 may capture image data using visible light, infrared light, and/or other non-visible electromagnetic radiation (e.g., ultraviolet light, far infrared light, terahertz radiation, microwave radiation, etc.). Camera 110 may include a thermal camera and/or a radar for radar imaging. The captured image data may include a continuous image sequence (e.g., video), a limited image sequence, still images, and/or a combination thereof. Camera 110 may include a digital camera for capturing and digitizing images and/or an analog camera for capturing images and storing image data in an analog format.

Camera 110 may include sensors that generate data arranged in one or more two-dimensional array(s) (e.g., image data or video data). As used herein, "video data" and "video" may be referred to more generally as "image data" and "image," respectively. Thus, "image data" or an "image" is meant to include "video data" and "videos" unless stated otherwise. Likewise, "video data" or a "video" may include a still image unless stated otherwise.

Other monitoring devices or sensors may capture information from monitored areas 106. For example, a motion detector 111-1 (e.g., something other than a camera) may detect motion in area 106-1. Motion detector 111-1 may include a proximity sensor, a magnetic sensor, an intrusion sensor, a pressure sensor, an infrared light sensor, a radar sensor, and/or a radiation sensor. A proximity sensor may determine, for example, when a door or window is open or shut, or has opened or has shut. Smoke detector 112-1 may detect smoke in area 106-1. Smoke detector 112-1 may also include a heat sensor.

Monitoring stations 125-1 through 125-N are coupled to displays 130-1 through 130-N (singular "monitoring station 125" and "display 130," respectively). In one embodiment, monitoring stations 125-1 through 125-N are also coupled to eye trackers 140-1 through 140-N (singular "eye tracker 140"). Monitoring station 125 and display 130 enable operators (not shown in FIG. 1) to view images from cameras 110. Eye tracker 140 tracks the gaze of an operator viewing display 130. Each monitoring station 125, display 130, and eye tracker 140 may be a "client" for an operator to interact with the monitoring system shown in environment 100.

Display 130 may receive and display video stream(s) from one or more cameras 110. A single display 130 may show images from a single camera 110 or from multiple cameras 110 (e.g., in multiple frames or windows on display 130). A single display 130 may also show images from a single camera but in different frames. That is, a single camera may include a wide-angle or fisheye lens, for example, and provide images of multiple areas 106. Images from the different areas 106 may be separated and shown on display 130 separately in different windows and/or frames. Display 130 may include a liquid-crystal display (LCD), a light-emitting diode (LED) display, an organic LED (OLED) display, a cathode ray tube (CRT) display, a plasma display, a laser video display, an electrophoretic display, a quantum dot display, a video projector, and/or any other type of display device.

Eye tracker 140 includes a sensor (e.g., a camera) that enables VMS 150 (or any device in environment 100) to determine where the eyes of an operator are focused. For example, a set of near-infrared light beams may be directed at an operator's eyes, causing reflections in the operator's corneas. The reflections may be tracked by a camera included in eye tracker 140 to determine the operator's gaze area. The gaze area may include a gaze point and an area of foveal focus. For example, an operator may sit in front of display 130 of monitoring station 125. Eye tracker 140 determines which portion of display 130 the operator is focusing on. Each display 130 may be associated with a single eye tracker 140. Alternatively, an eye tracker 140 may correspond to multiple displays 130. In this case, eye tracker 140 may determine which display and/or which portion of that display 130 the operator is focusing on.

Eye tracker 140 may also determine the presence, a level of attention, focus, drowsiness, consciousness, and/or other states of a user. Eye tracker 140 may also determine the identity of an operator. The information from eye tracker 140 can be used to gain insights into operator behavior over time or determine the operator's current state. In some implementations, display 130 and eye tracker 140 may be implemented in a virtual reality (VR) headset worn by an operator. The operator may perform a virtual inspection of area 106 using one or more cameras 110 as input into the VR headset.

Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

VMS 150 may include one or more computer devices, such as, for example, server devices, which coordinate operation of cameras 110, display devices 130, and/or eye tracking system 140. VMS 150 may receive and store image data from cameras 110. VMS 150 may also provide a user interface for operators of monitoring stations 125 to view image data stored in VMS 150 or image data streamed from cameras 110. VMS 150 may include a rule engine to receive notifications of events from cameras 110 and determine whether these notifications invoke a rule (e.g., meet criteria) to perform an operation (e.g., generate an alarm). For example, if camera 110 detects motion in area 106, camera 110 may notify VMS 150. As a result of a rule, the rule engine in VMS 150 may send an alarm to display 130 at monitoring station 125 through network 120. Events (and their notifications) may be triggered by devices and sensors in environment 100 other than cameras 110. For example, environment may include motion detectors, photodetectors, etc., that can generate notifications of events.

In some embodiments, environment 100 does not include a separate VMS 150. Instead, the services provided by VMS 150 are provided by monitoring stations 125 and/or cameras 110 themselves or in a distributed manner among the devices in environment 100. For example, cameras 110 may include a rule engine to determine when notifications of events invoke a rule to perform an operation (e.g., set off an alarm based on detected motion). Likewise, VMS 150 may perform operations described as performed by camera 110. For example, VMS 150 may analyze image data to detect motion rather than camera 110.

Although FIG. 1 shows exemplary components of environment 100, in other implementations, environment 100 may include fewer components, different components, differently arranged components, or additional components than depicted in FIG. 1. Additionally or alternatively, any one device (or any group of devices) may perform functions described as performed by one or more other devices.

Figure 2:
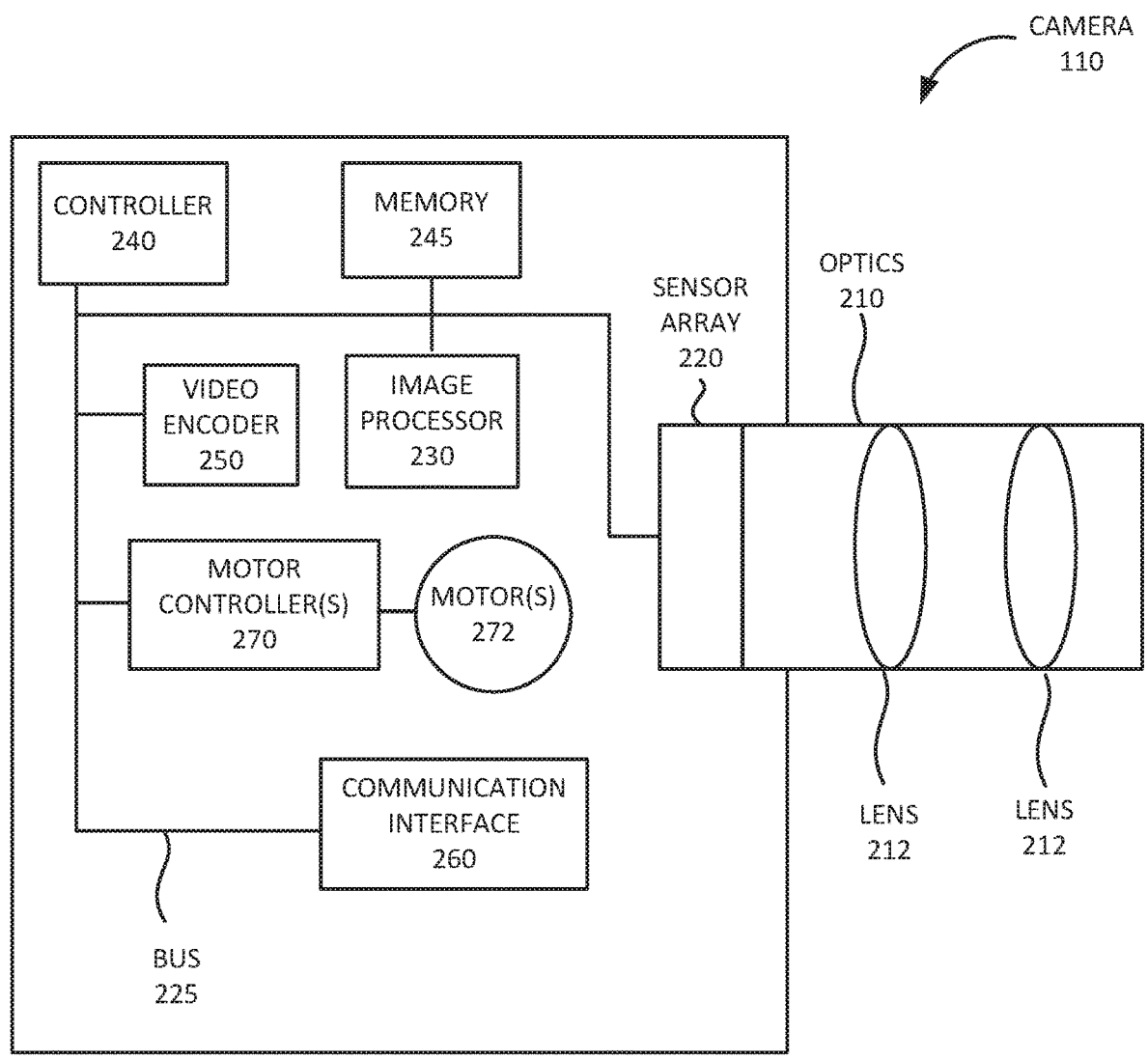
FIG. 2 is a block diagram illustrating exemplary components of a camera in one embodiment.

FIG. 2 is a block diagram illustrating exemplary components of a camera 110 in one embodiment. As shown in FIG. 2, camera 110 may include an optics chain 210, a sensor array 220, a bus 225, an image processor 230, a controller 240, a memory 245, a video encoder 250, and/or a communication interface 260. In one embodiment, camera 110 may include one or more motor controllers 270 (e.g., three) and one or more motors 272 (e.g., three) for panning, tilting, and zooming camera 110.

Optics chain 210 includes an enclosure that directs incident radiation (e.g., light, visible light, infrared waves, millimeter waves, etc.) to a sensor array 220 to capture an image based on the incident radiation. Optics chain 210 includes lenses 212 collect and focus the incident radiation from a monitored area onto sensor array 220.

Sensor array 220 may include an array of sensors for registering, sensing, and measuring radiation (e.g., light) incident or falling onto sensor array 220. The radiation may be in the visible light wavelength range, the infrared wavelength range, or other wavelength ranges. Sensor array 220 may include, for example, a charged coupled device (CCD) array and/or an active pixel array (e.g., a complementary metal-oxide-semiconductor (CMOS) sensor array). Sensor array 220 may also include a microbolometer (e.g., when camera 110 includes a thermal camera or detector).

Sensor array 220 outputs data that is indicative of (e.g., describes properties or characteristics) the radiation (e.g., light) incident on sensor array 220. For example, the data output from sensor array 220 may include information such as the intensity of light (e.g., luminance), color, etc., incident on one or more pixels in sensor array 220. The light incident on sensor array 220 may be an "image" in that the light may be focused as a result of lenses in optics chain 210.

Sensor array 220 can be considered an "image sensor" because it senses electromagnetic radiation (e.g., light) impinging ling on sensor array 220 and converts the radiation into a multidimensional signal. As the term is used herein, an "image" includes the data indicative of the radiation (e.g., describing the properties or characteristics of the light) incident on sensor array 220. Accordingly, the term "image" may also be used to mean "image sensor data" or any data or data set describing an image. Further, a "pixel" may mean any region or area of sensor array 220 for which measurement(s) of radiation are taken (e.g., measurements that are indicative of the light incident on sensor array 220). A pixel may correspond to one or more (or less than one) sensor(s) in sensor array 220. In alternative embodiments, sensor 220 may be a linear array that may use scanning hardware (e.g., a rotating mirror) to form images, or a non-array sensor which may rely upon image processor 230 and/or controller 240 to produce image sensor data. Video encoder 250 may encode image sensor data for transmission to other device in environment 100, such as station 125 and/or VMS 150. Video encoder 250 may use video coding techniques such as video coding standards of the ISO/MPEG or ITU-H.26X families.

Bus 225 is a communication path that enables components in camera 110 to communicate with each other. Controller 240 and/or image processor 230 perform signal processing operations on image data captured by sensor array 220. Controller 240 and/or image processor 230 may include any type of single-core or multi-core processor, microprocessor, latch-based processor, and/or processing logic (or families of processors, microprocessors, and/or processing logics) that interpret and execute instructions. Controller 240 and/or image processor 230 may include or be coupled to a hardware accelerator, such as a graphics processing unit (GPU), a general purpose graphics processing unit (GPGPU), a Cell, a field programmable gate array (FPGA), an application specific integrated circuit (ASIC), and/or another type of integrated circuit or processing logic.

Controller 240 may also determine and control the desired focus and position (e.g., tilt and zoom) of camera 110. To do so, controller 240 sends commands to one or more motor controllers 270 to drive one or more motors 272 to tilt and/or pan camera 110 or optically zoom lenses 212.

Memory 245 may include any type of volatile and/or non-volatile storage device that stores information and/or instructions. Memory 245 may include a random access memory (RAM) or any type of dynamic storage device, a read-only memory (ROM) device or any type of static storage device, a magnetic or optical recording memory device and its corresponding drive, or a removable memory device. Memory 245 may store information and instructions (e.g., applications and/or an operating system) and data (e.g., application data) for use by processor camera 110.

Memory 245 may store instructions for execution by controller 240 and/or image processor 230. The software instructions may be read into memory 245 from another computer-readable medium or from another device. The software instructions may cause controller 240 and/or image processor 230 to perform processes described herein. For example, camera 110 may perform operations relating to the image processing (e.g., encoding, transcoding, detecting objects, etc.) in response to controller 240 and/or image processor 230 executing software instructions stored in memory 245. Alternatively, hardwired circuitry (e.g., logic) may be used in place of, or in combination with, software instructions to implement processes described herein.

Communication interface 260 includes circuitry and logic circuitry that includes input and/or output ports, input and/or output systems, and/or other input and output components that facilitate the transmission of data to another device. For example, communication interface 360 may include a network interface card (e.g., Ethernet card) for wired communications or a wireless network interface (e.g., a WiFi) card for wireless communications.

Although FIG. 2 shows exemplary components of camera 110, in other implementations, camera 110 may include fewer components, different components, differently arranged components, or additional components than depicted in FIG. 2. Additionally or alternatively, one or more components of camera 110 may perform functions described as performed by one or more other components of camera 110. For example, controller 240 may perform functions described as performed by image processor 230 and vice versa. Alternatively or additionally, camera 110 may include a computing module as described below with respect to FIG. 3.

Figure 3:
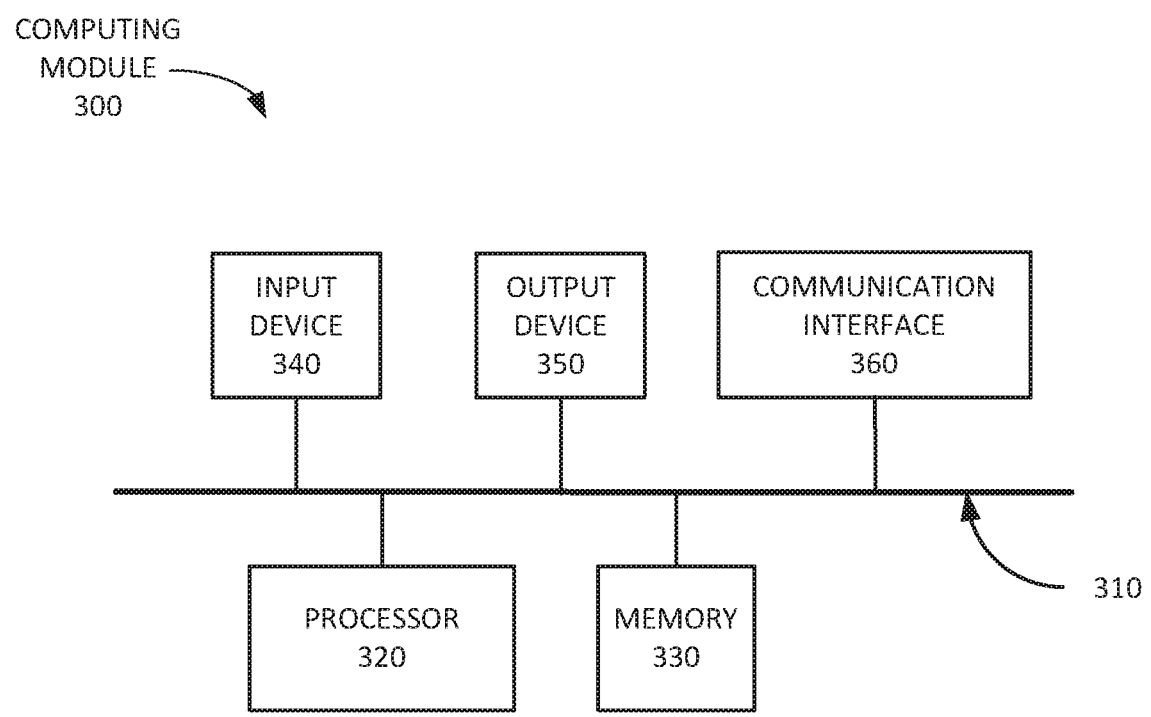
FIG. 3 is a block diagram illustrating exemplary components of a computing module in one embodiment.

FIG. 3 is a block diagram illustrating exemplary components of a computing module 300 in one embodiment. Devices such as VMS 150, eye-tracking system 140, display devices 130, motion detector 111-1, and/or smoke detector 112-1 may include one or more computing modules 300. As shown in FIG. 3, computing module 300 may include a bus 310, a processor 320, a memory 330, and/or a communication interface 360. In some embodiments, computing module 300 may also include an input device 340 and/or an output device 350.

Bus 310 includes a path that permits communication among the components of computing module 300 or other devices. Processor 320 may include any type of single-core processor, multi-core processor, microprocessor, latch-based processor, and/or processing logic (or families of processors, microprocessors, and/or processing logics) that interprets and executes instructions. Processor 320 may include an ASIC, an FPGA, and/or another type of integrated circuit or processing logic. Processor 320 may include or be coupled to a hardware accelerator, such as a GPU, a GPGPU, a Cell, a FPGA, an ASIC, and/or another type of integrated circuit or processing logic.

Memory 330 may include any type of volatile and/or non-volatile storage device that stores information and/or instructions. Memory 330 may include a RAM or any type of dynamic storage device, a ROM or any type of static storage device, a magnetic or optical recording memory device and its corresponding drive, or a removable memory device. Memory 330 may store information and instructions (e.g., applications and an operating system) and data (e.g., application data) for use by processor 320.

Memory 330 may store instructions for execution by processor 320. The software instructions may be read into memory 330 from another computer-readable medium or from another device. The software instructions may cause processor 320 to perform processes described herein. Alternatively, hardwired circuitry (e.g., logic) may be used in place of, or in combination with, software instructions to implement processes described herein.

The operating system may include software instructions for managing hardware and software resources of computing module 300. For example, the operating system may include Linux, Windows, OS X, Android, an embedded operating system, etc. Applications and application data may provide network services or include applications, depending on the device in which the particular computing module 300 is found.

Communication interface 360 may include a transmitter and/or receiver (e.g., a transceiver) that enables computing module 300 to communicate with other components, devices, and/or systems. Communication interface 360 may communicate via wireless communications (e.g., radio frequency, infrared, etc.), wired communications, or a combination thereof. Communication interface 360 may include a transceiver that converts baseband signals to radio frequency (RF) signals or vice versa and may be coupled to an antenna.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications or a wireless network interface (e.g., a WiFi) card for wireless communications.

Some devices may also include input device 340 and output device 350. Input device 340 may enable a user to input information into computing module 300. Input device 370 may include a keyboard, a mouse, a pen, a microphone, a camera, a touch-screen display, etc.

Output device 350 may output information to the user. Output device 350 may include a display, a printer, a speaker, etc. Input device 340 and output device 350 may enable a user interact with applications executed by computing module 300. In the case of a "headless" device (such as a deployed remote camera), input and output is primarily through communication interface 360 rather than input device 340 and output device 350.

Computing module 300 may include other components (not shown) that aid in receiving, transmitting, and/or processing data. Moreover, other configurations of components in computing module 300 are possible. In other implementations, computing module 300 may include fewer components, different components, additional components, or differently arranged components than depicted in FIG. 3.

Additionally or alternatively, one or more components of computing module 300 may perform one or more tasks described as being performed by one or more other components of computing module 300.

Figure 4:
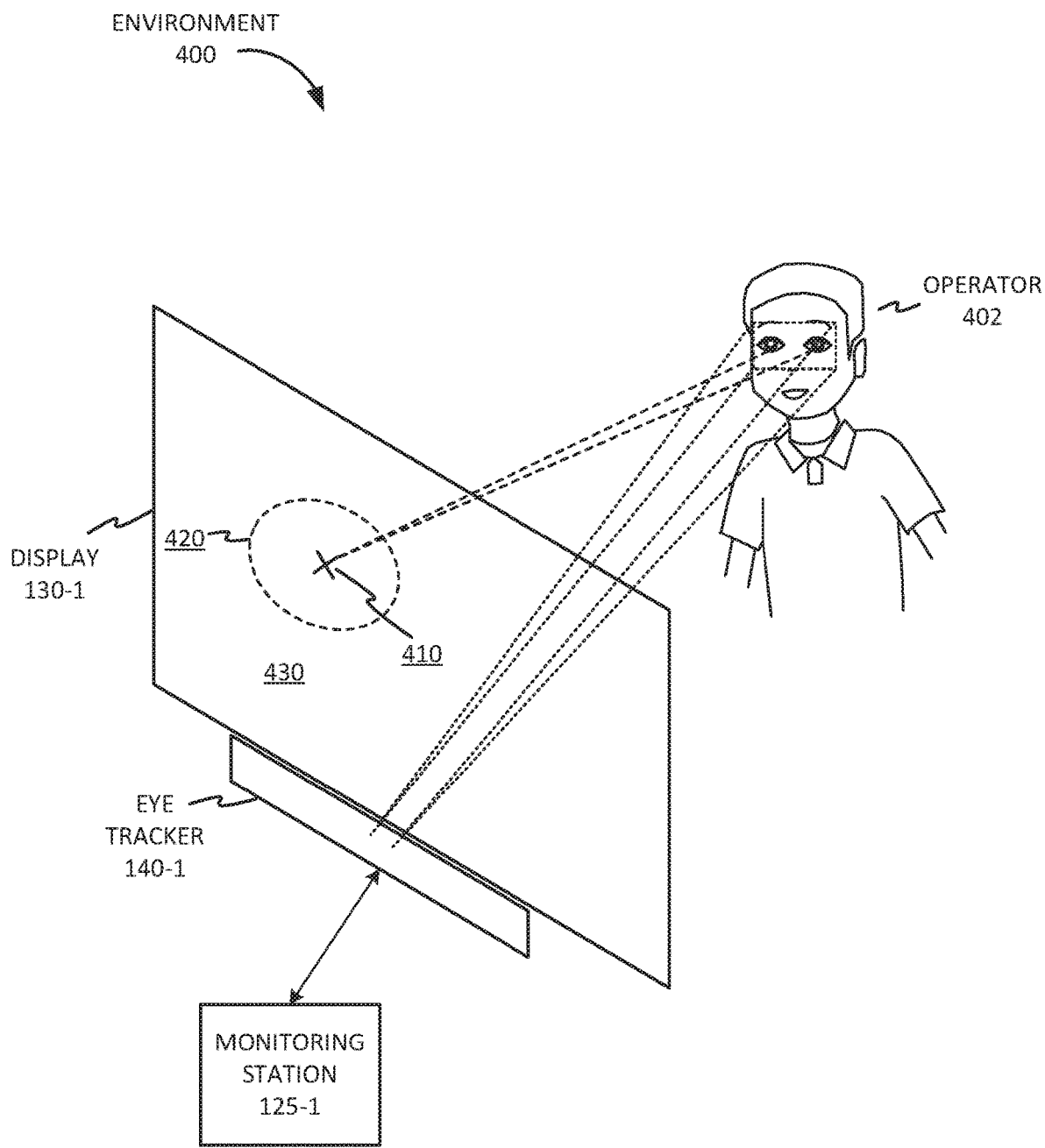
FIG. 4 illustrates an environment in which an operator views a display having an eye tracker in one embodiment.

FIG. 4 illustrates an exemplary environment 400 of an operator 402 viewing display 130 having eye tracker 140 in one embodiment. Display 130 may include any type of display for showing information to operator 402. Operator 402 views display 130 and can interact with VMS 150 via an application running on monitoring station 125. For example, operator 402 may watch a video of area 106. Monitoring station 125 may sound an alarm when, according to rules, there is motion in area 106. Operator 402 may then respond by silencing the alarm via a keyboard interacting with an application running on monitoring station 125.

Eye tracker 140 includes a sensor (e.g., a camera) that enables monitoring station 125 to determine where the eyes of operator 402 are focused. In FIG. 4, for example, operator 402 sits in front of display 130 and the sensor in eye tracker 140 senses the eyes of operator 402. For example, eye tracker 140 may determine a gaze point 410, which may be represented as a location (e.g. pixel value) on display 130. Based on the relative position of the operator and the display 130, a foveal vision area 420 (or "area 420") corresponding to the foveal vision of operator 402 may be estimated. Foveal vision corresponds to the detailed visual perception of the eye, and approximately subtends 1-2 solid degrees. Accordingly, area 420 on display 130 may be calculated and understood to correspond to the part of operator's 402 vision with full visual acuity. In an alternative embodiment, area 420 may be determined experimentally during a setup procedure for a particular operator 402. Area 420 is in contrast to peripheral vision area 430 outside of foveal vision area 420, which corresponds to the peripheral vision of operator 402. Gaze point 410 is approximately in the center of area 420 and corresponds to the line-of-sight from gaze point 410 to the eyes of operator 402. In one embodiment, information identifying gaze point 410 may be transmitted to VMS 150.

Figure 5A:
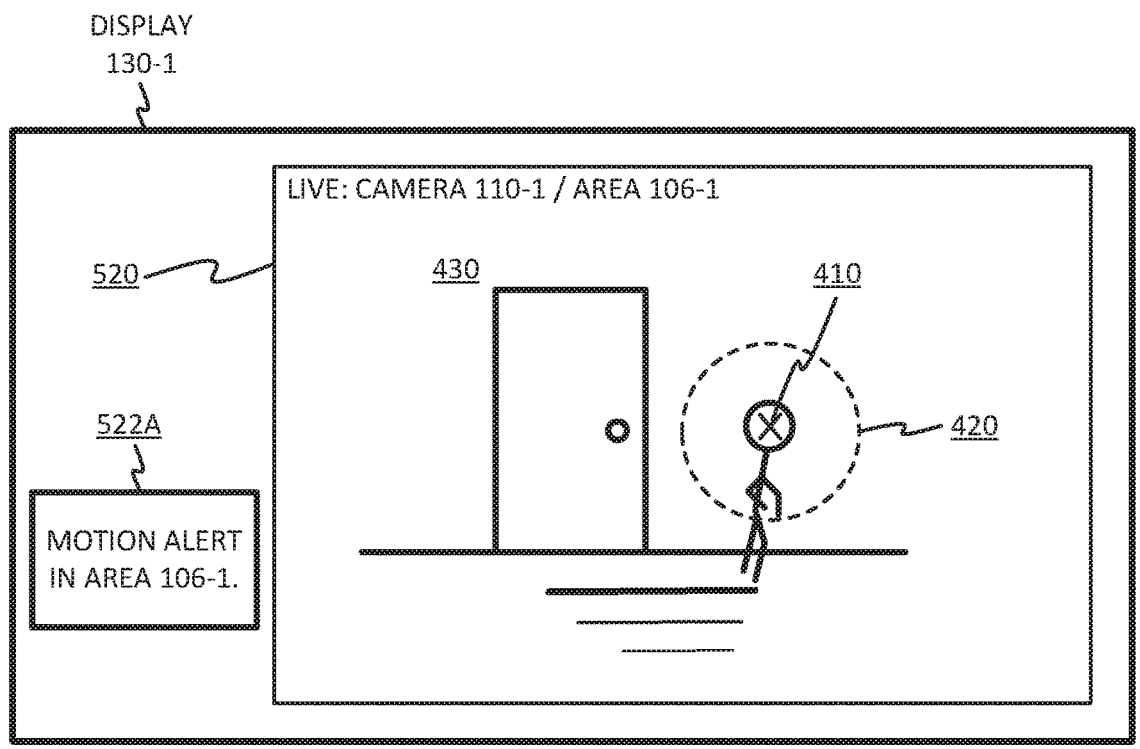
FIGS. 5A and 5B illustrate display from the perspective of an operator in two embodiments.

FIG. 5A illustrates display 130 from the perspective of operator 402. As shown in FIG. 5A, display 130 includes gaze point 410, foveal vision area 420, and peripheral vision area 430. Display 130 also includes a video frame 520 in which a video stream is presented to operator 402. In this example, frame 520 shows a video stream from camera 110-1 of area 106-1, which happens to include a door and an individual who appears to be moving. Operator's 402 foveal vision area 420 encompasses the individual and gaze point 410 is directly on the individual's face. The door displayed in frame 520, on the other hand, appears in operator's 402 peripheral vision area 430. In one example described in more detail below, when motion is sensed in area 106-1, then station 125-1 displays the following alert is displayed in a window 522A of display 130: MOTION ALERT IN AREA 106-1.

Based on the location of gaze point 410 and/or area 420, different actions may be triggered, so that the information generated by eye tracker 140 may be interpreted as an operator input to the video management system. For example, if eye tracker 140-1 determines that operator 402 is viewing frame 520-1 showing the video stream from camera 110-1, then station 125-1, VMS 150, and/or camera 110-1 may determine that the alert in window 522A can be dismissed.

Figure 5B:
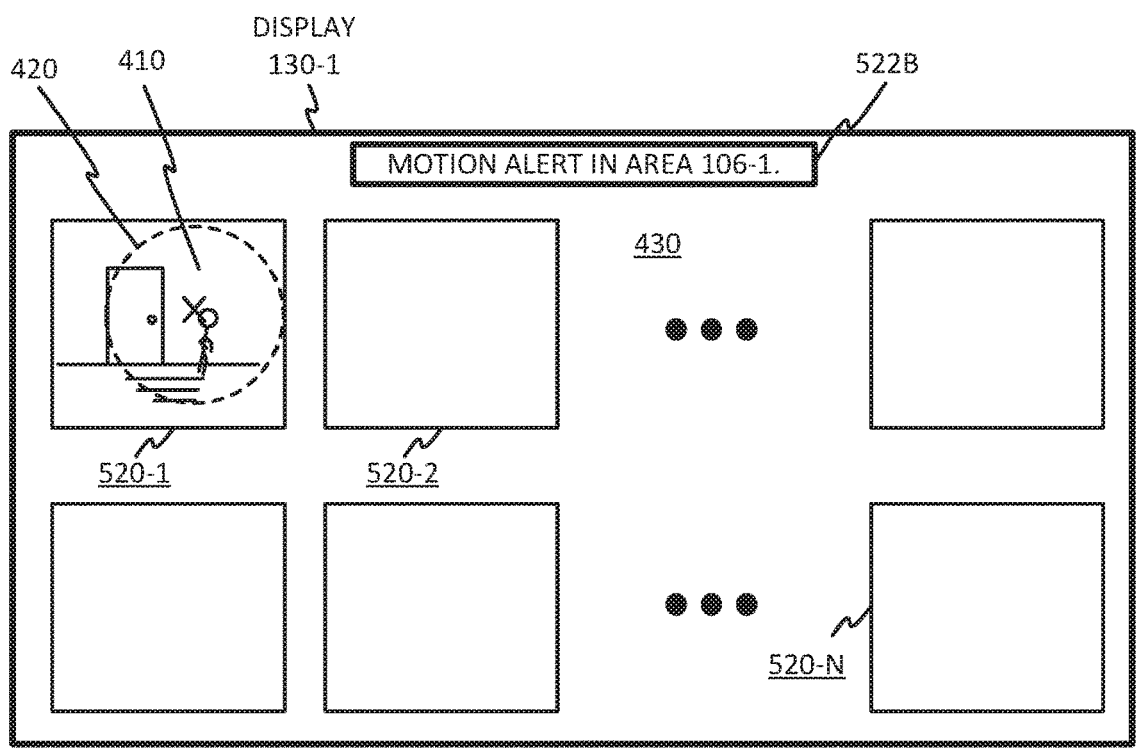

FIG. 5B also illustrates display 130 from the perspective of operator 402. In contrast to FIG. 5A, however, display 130 in FIG. 5B shows numerous frames 520-1 through 520-N (individually "frame 520"; plurally "frame 520"). Each frame 520-1 through 520-N may present a different video stream so operator 402 can monitor more than one area. The different streams may be produced by different cameras 110-1 through 110-M. Alternatively or additionally, each frame 520-1 though 520-N may display different streams generated by a common camera 110-x. For example, camera 110-x may use a "fisheye" lens and capture video from an extended angular area. The video may be processed to reduce distortions introduced by the fisheye lens, and separate the extended angular area into separate video streams corresponding to different areas, which may be separately presented in frames 520-1 through 520-N. As with FIG. 5A, display 130 in FIG. 5B includes gaze point 410, foveal vision area 420, and peripheral vision area 430.

In this example, frame 520-1 may show a video stream from camera 110-1 of area 106-1; video frame 520-2 may show a video stream from camera 110-2 of area 106-2; etc. Operator's 402 foveal vision area 420 in FIG. 5B encompasses the majority of frame 520-1 and gaze point 410 is close to the individual's face. The door displayed in frame 520 is also in foveal vision area 420. The other frames 520-2 through 520-N, on the other hand, are in operator's 402 peripheral vision area 430. The location of gaze point 410 and/or foveal vision area 420 may be used to select and/or designate a particular frame 520-x for subsequent processing which may be different from other frames 520. For example, as shown in FIG. 5B, gaze point 410 may be used to indicate that frame 520-1 is a frame of interest to the operator. Accordingly, the video monitoring system may allocate more resources to frame 520-1 (e.g., bandwidth and/or processing resources) to improve the presentation of the video stream in frame 520-1, and reduce resources allocated to other streams corresponding to frames which are not the focus (e.g., in the peripheral vision) of the operator.

Figure 6A:
FIG. 6A is a block diagram of exemplary functional components of a monitoring device, such as a camera, motion detector, and/or smoke detector in the environment of FIG. 1 in one embodiment.
Figure 6A:
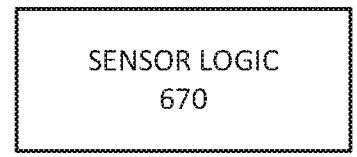
Figure 6B:
FIG. 6B is a block diagram of exemplary functional components of a video management system in the environment of FIG. 1 in one embodiment.
Figure 6B:
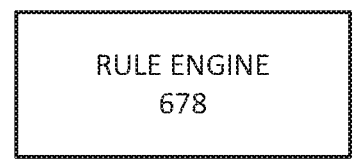
Figure 6C:
FIG. 6C is a block diagram of exemplary functional components of a monitoring station, eye tracker, and/or display in the environment of FIG. 1 in one embodiment.
Figure 6C:
Figure 6C:
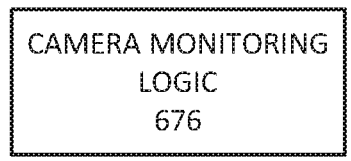
Figure 6C:
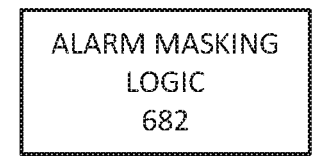
Figure 6C:
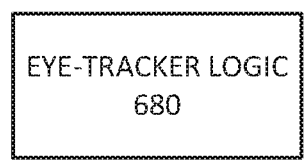
Figure 6C:
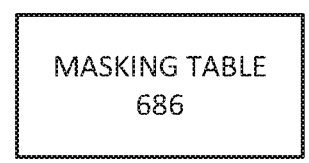
Figure 6C:
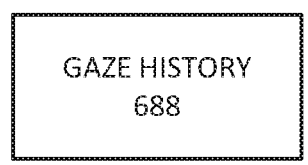
Figure 6C:
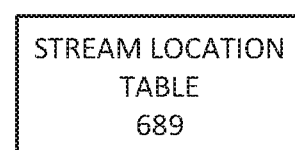

FIGS. 6A, 6B, and 6C are block diagram of exemplary functional components of a monitoring device (e.g., camera 110, motion detector 111-1, and/or smoke detector 112-1), VMS 150, monitoring station 125, display 130, and/or eye tracker 140 in one embodiment. The functional components of camera 110 may be implemented, for example, via controller 240 executing instructions stored in memory 245. The functional components of motion detector 111-1, smoke detector 112-1, monitoring station 125, display 130, and/or eye tracker 140 may be implemented, for example, via processor 320 executing instructions stored in memory 245. Alternatively, some or all of the functional components depicted in FIGS. 6A, 6B, and 6C may be implemented via hard-wired circuitry.

FIG. 6A is a block diagram of exemplary functional components of a monitoring device (e.g., camera 110, motion detector 111-1, and/or smoke detector 112-1) in one embodiment. Functional components of a monitoring device may include sensor logic 670.

Sensor logic 670 allows monitoring devices, such as camera 110, motion detector 111-1, and/or smoke detector 112-1 to detect events and send notifications of events to other devices. For example, sensor logic 670 in camera 110 may compare one image to the next to detect motion. If motion is detected, camera 110 may send an event notification to another device, such as VMS 150. Sensor logic 670 in camera 110 may also detect a face of a person or any other object and enable camera 110 to send an event notification to VMS 150 indicating the object that was recognized.

Sensor logic 670 in smoke detector 112-1 may sense particles and enable detector 111-1 to send a notification of smoke to VMS 150. Likewise, sensor logic 670 in motion detector 111-1 may detect motion by receiving infrared light in an area 106 to enable detector 111-1 to send an event notification to VMS 150.

FIG. 6B is a block diagram of exemplary functional components of VMS 150 in one embodiment. VMS 150 may include rule engine 678 and/or rule table 684. Rule engine 678 receives event notifications (e.g., from camera 110), interprets rules stored in rule table 684, and performs actions when the conditions of the rules are met. For example, if motion is detected by camera 110-1, rule engine 678 may sound an alarm as indicated in event rule table 684.

FIG. 6C is a block diagram of exemplary functional components of station 125, eye tracker 140, and/or display 130 in one embodiment. These device may include camera monitoring logic 676, eye tracker logic 680, alarm masking logic 682, masking table 686, gaze history 688, and/or stream location table 689.

Camera monitoring logic 676 enables operator 402 to view the video streams on display 130 from multiple cameras 110. Eye tracker logic 680 performs the functions of eye-tracker 140 described above for determining gaze point 410 and foveal vision area 420. Depending on gaze point 410 and/or foveal area 420, alarm masking logic 682 can silence, turn off, or mask an alarm intended for operator 402, such as the alarm that motion was detected by camera 110-1 in area 106-1. Masking rule table 686 may instruct alarm masking logic 682 how and when to mask an alarm based on gaze point 410 and/or foveal area 420. Gaze history 688 stores past gaze points 410 (e.g., associated with the time of the gaze) and past foveal vision areas 420 (e.g., associated with time). Stream location table 689 associates each stream with a display and/or a location on a display. Eye tracker logic 680 and alarm making logic 682 may use the information in stream location table 689 to determine which stream the operator is looking at.

The functional components (applications and data) shown in FIGS. 6A, 6B, and 6C may be arranged differently and/or include more or fewer components. For example, in one embodiment, camera 110 includes rule engine 678 and rule table 684 and camera 110 can issue event notifications and/or alarm notifications.

FIG. 7A illustrates an exemplary event rule table 684. As shown in FIG. 7A, event rule table 684 may include an event field 702 and an action field 704. If the events specified in event field 702 occur, then the action specified in action field 704 are carried out. Additional or fewer fields are possible than those shown in FIG. 7A.

As shown in exemplary record 710-2, if motion is detected at motion detector 111-1 (e.g., MOTION DETECTED AT DETECTOR 111-1 as specified in event field 702), then a notification is sent to the station (e.g., station 125-1) showing the video stream from camera 110-1 as specified in action field 704. The notification specified in field 704 of record 710-1 is: MOTION ALERT IN AREA 106-1. In this example, the action specified in action field 704 is the same for record 710-1 as record 710-2 despite the alert being triggered by different events.

As shown in exemplary record 710-2, if smoke is detected by smoke detector 112-1 (e.g., SMOKE DETECTED AT DETECTOR 112-2 as specified in event field 702), then a notification is sent to the station (e.g., station 125-1) showing the video stream from camera 110-1 as specified in action field 704. The notification specified in action field 704 of record 710-2 is: SMOKE ALERT IN AREA 106-1. Encompases the encompases FIG. 7B illustrates an exemplary masking table 686. As shown in FIG. 7B, masking table 686 may include a notification field 750, a video stream field 752, and/or an action field 754. If the notification specified in notification field 750 is present, and an operator is gazing at the location specified in video stream field 752, then the action specified in action field 754 is taken with respect to masking the corresponding notification. In this embodiment, masking table 686 associates notifications (in notification field 750) with video streams (specified in video stream field 752).

Action field 754 may specify how alarm masking logic 682 should control the state of an alarm associated with the corresponding notification. For example, alarm masking logic 682 may silence an alarm, deactivate an alarm, prevent an alarm from activating, change the visual presentation and/or audio presentation of an alarm (e.g., to be less conspicuous).

As shown in exemplary record 760-1, if the notification is that of a motion alert in area 106-1 (e.g., MOTION ALERT IN AREA 106-1 as specified in notification field 750), and if the operator is viewing the video stream from camera 110-1, then the corresponding alert silenced (as specified in action field 754).

As shown in exemplary record 760-2, if the notification is that of a smoke alert in area 106-1 (e.g., SMOKE ALERT IN AREA 106-1 as specified in notification field 750), and if the operator is viewing the video stream from camera 110-1 or from camera 110-2, then the corresponding alert paused (as specified in action field 754).

As shown in exemplary record 760-3, if the notification is that of a door opened in area 106-1 (e.g., DOOR OPENED IN AREA 106-1 as specified in notification field 750), and if the operator is viewing the video stream from camera 110-1, then the corresponding alert is masked and the alert is automatically acknowledged (as specified in action field 754). Masking an alert includes preventing an alert from generating a sound or generating a visual indication, for example. An automatic acknowledgment may include recording that operator 402 effectively saw the alert, as though operator 402 had pressed a key.

In one embodiment, video stream field 752 may specify a length of time (e.g., a threshold) that the operator must gaze at or view a video stream before the action specified in action field 754 should occur. In one embodiment, the threshold may be a default value or may be determined by eye tracker 140 based on different circumstances.

In another embodiment, video stream field 752 may specify where (e.g., a location or area) within a video stream the operator must gaze for the action in action field 754 to occur. For example, with reference to FIG. 5A, masking table 686 may specify that alarm masking logic 682 must determine that operator 402 has gazed at the door (e.g., as defined by an area) for a period of time before dismissing an alert. As another example, with reference to FIG. 5A, masking table 686 may specify that alarm masking logic 682 must determine that operator 402 has gazed at the object that is moving (e.g., tracked the object that is moving that caused the alert) for a period of time before dismissing an alert.

Figure 7C:
FIG. 7C illustrates an exemplary stream location table in one embodiment.
Figure 7C:

FIG. 7C illustrates an exemplary stream location table 689. As shown in FIG. 7C, stream location table 689 may include a video stream field 792 and a location field 794. Additional or fewer fields are possible than those shown in FIG. 7A.

Video stream field 792 specifies a video stream (e.g., from any of the cameras 110). Location field 794 specifies the display and/or the location on the display that the corresponding video stream is being displayed. If alarm masking logic 682 needs to know the location of a stream on a display (or even which display is showing a stream), then alarm masking logic 682 can access stream location table 689. For example, if masking table 686 requires that operator 402 view the video stream from camera 110-1, then alarm masking logic 682 accesses table 689 to determine where on display 130-1 operator 402 must gaze to be viewing the video stream from camera 110-1.

As shown in exemplary record 796-1, the video stream from camera 110-1 is being displayed in frame 520-1 of display 130-1 (e.g., as depicted in FIG. 5B). As shown in exemplary record 796-2, the video stream from camera 110-2 is being displayed in frame 520-2 of display 130-1.

Figure 8:
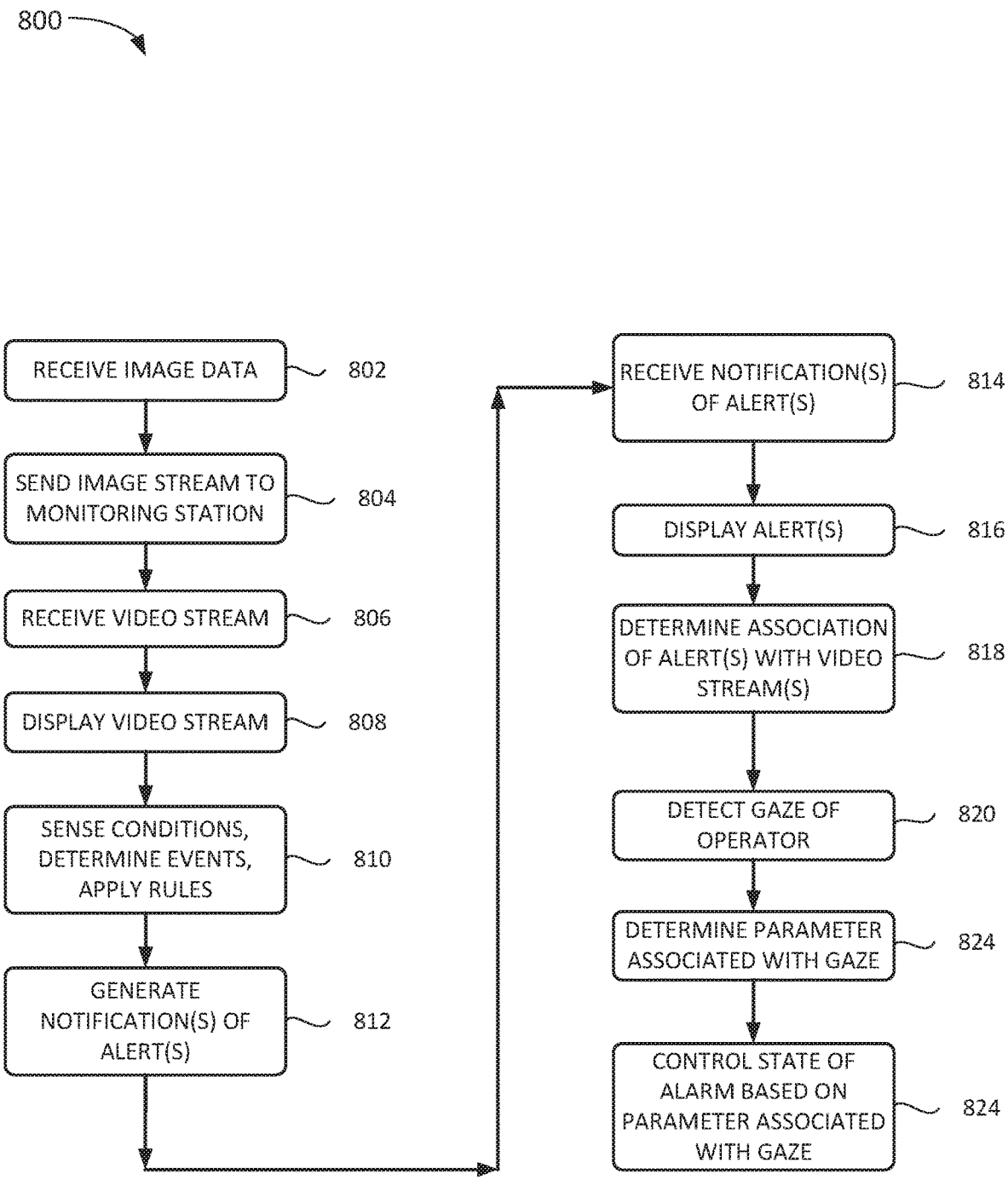
FIG. 8 is a flowchart of an exemplary process for masking an alarm based on the gaze of an operator in one embodiment.

FIG. 8 is a flowchart of a process 800 for masking an alarm based on the gaze of an operator. Process 800 can be run in or by camera 110, monitoring station 125, eye tracker 140, display 130, and/or VMS 150. Process 800 is described with the following example: camera 110-1 captures video of area 106-1; display 130-1 shows video from camera 110-1 of area 106-1; eye tracker 140-1 tracks the gaze point 410 and foveal vision area 420 of operator 402; display 130-1 displays an alarm for operator 402 to see; the alarm is masked when operator 402 views the video stream associated with area 106-1 (e.g., from camera 110-1).

Process 800 begins by receiving image data (block 802). In this example, camera 110-1 receives light through optics chain 210 and captures images on sensor array 220. Images are encoded into a video stream and sent to VMS 150 and/or directly to monitoring station 125-1 for display (block 804). If VMS 150 receives the video stream, the stream may be forwarded to monitoring station 125-1 for display. VMS 150 and/or monitoring station 125-1 receives the video stream (block 806).

The video stream is displayed on a display (block 808). In the current example, monitoring station 125-1 shows the video stream of area 106-1 on display 130-1. In FIG. 5A, for example, display 130-1 includes frame 520 that shows the video stream of area 106-1 as captured by camera 110-1. In FIG. 5B, display 130-1 includes upper-left frame 520-1 that shows the video stream of area 106-1 as captured by camera 110-1. Other frames 520-*x* on display 130 in FIG. 5B can show other areas 106-*x*, for example.

Process 800 continues by sensing conditions, determining events, and applying rules (block 810). In this example, motion is detected in area 106-1 by camera 110-1 and/or motion detector 111-1. For example, assume that a person moves in area 106-1 (e.g., as shown in frame 520 of FIG. 5A and frame 520-1 of FIG. 5B). Camera 110-1 may sense that motion has occurred in area 106-1 (e.g., by analyzing the video stream of area 106-1). Camera 110-1 may generate an event of MOTION DETECTED. Camera 110-1 may send a notification of this event to VMS 150, for example. Alternatively or additionally, motion detector 111-1 may sense that motion has occurred in area 106-1 (e.g., by analyzing infrared light in area 106-1). Motion detector 111-1 may generate an event of MOTION DETECTED and send a notification of this event to VMS 150, for example.

In the current example, camera 110-1 and/or motion detector 111-1 send a MOTION DETECTED event notification to VMS 150. At VMS 150, rule engine 678 applies the event (e.g., MOTION DETECTED at camera 110-1 and/or at motion detector 111-1) against rule table 684 and determines to generate a notification (block 812). In this case, the notification is MOTION ALERT IN AREA 106-1 that is to be sent to monitoring station 125-1, e.g., the station showing the video stream from camera 110-1. The alert is intended for operator 402 to acknowledge.

Monitoring station 125-1 receives the notification (block 814) and alerts the operator (block 816). In the current example, in response to receiving the notification, monitoring station 125-1 displays window 522 on display 130-1 to operator 402. As shown in FIG. 5A, monitoring station 125-1 receives and displays the following alert on display 130-1 in window 522A: MOTION ALERT IN AREA 106-1. As another example, as shown in FIG. 5B, monitoring station 125-1 receives and displays the same alert in frame 522B.

As mentioned above, the notification signal may be independent from the camera providing the corresponding video stream. That is, motion detector 111-1 may detect motion in area 106-1, independently of camera 110-1, and generate a MOTION DETECTED event, which generates the MOTION ALERT IN AREA 106-1 notification. Further, smoke detector 112-1 may detect smoke in area 106-1, independently of camera 110-1, and generate a SMOKE DETECTED event, which generates a SMOKE ALERT IN AREA 106-1 notification. In these cases, the notification signal (e.g., of an alert) was triggered by an event (e.g., motion detected).

Process 800 continues by determining that the notification is associated with a video stream (block 818). Alarm masking logic 682 consults masking table 686 to determine the association between a particular alert and a particular video stream. In the current example, masking logic 682 determines that the notification MOTION ALERT IN AREA 106-1 is associated with the video stream from camera 110-1.

Eye tracker 140 detects a gaze of an operator viewing the display (block 820) and determines a parameter associated with the gaze (block 822). For example, as described above and shown in FIGS. 5A and 5B, eye tracker 140 determines a foveal area 420 and gaze point 410. Eye tracker 140 may also determine whether a gaze point 410 and/or gaze area 420 corresponds to a video stream from a particular camera 110. Eye tracker 140 may also determine a period of time that a gaze point 410 coincides with a video stream from a particular camera 110. Given that display 130-1 shows an alert, the parameter (for eye tracker 140 to determine) may be specified in video stream field 752 of masking table 686. For example, alert MOTION ALERT IN AREA 106-1 is associated with gazing at the video stream from camera 110-1 (e.g., for a period of time). Eye tracker 140 and/or alarm masking logic 682 may therefore determine the following parameter: the amount of time that operator 402 views the video stream from camera 110-1.

In one embodiment, determining the parameter associated with the gaze may include determining whether operator 402 was viewing a video stream at some point in the past. For example, a door-opening alert may be associated with a time that the door opened (or closed). The parameter may include determining whether operator 402 was viewing the corresponding door before it was opened (or before it was closed). In this embodiment, alarm masking logic 682 may access gaze history 688 to determine whether operator 402 was viewing a particular video stream at some point in the past (e.g., for a period of time).

Process 800 continues by controlling a state of an alert associated with the notification based upon the parameter associated with the gaze point (block 824). For example, when operator 402 has viewed the video stream from camera 110-1 for a sufficiently long period of time, then masking logic 682 may cancel the alert associated with motion having been detected in area 106-1. In one embodiment, eye tracker logic 680 and/or masking logic 682 accesses stream location table 689 to determine that a gaze at gaze point 410 corresponds to video stream from camera 110-1.

Controlling the state of an alarm associated with the notification may include many different things. For example, controlling the state may include deactivating a currently active alarm, preventing an inactive alarm from activating (e.g., masking), and/or changing the visual presentation and/or the audio presentation of the alarm (e.g., to be less conspicuous). Changing the audio presentation of the alarm may include decreasing the volume of the alarm. Changing the visual presentation of the alarm may include decreasing the size of the visual indicator of the alarm.

Process 800 may include initiating (e.g., automatically) a recording of the received video stream associated with the detected motion, storing parameters characterizing the object, and/or magnifying the video stream in the proximity of the object.

As noted above, the notification for an alert may result from sensor logic 670 detecting that an object in a video stream has moved. The alarm notification may result from sensor logic 670 detecting that an object has appeared in the video stream (e.g., an object belonging to a class of objects, such as merchandise). The alarm notification may result from sensor logic 670 detecting that an object has entered or left the field of view of camera 110-1. The alarm notification may result from sensor logic 670 detecting or recognizing a face of a person (e.g., any person or a specific person).

In other embodiments, operator 402 may silence alarms, etc., by gazing at points other than video streams. For example, alarm masking logic 682 may silence an alarm by determining that operator 402 was gazing at window 522 for a period of time.

This application incorporates by reference herein the following patent applications filed the same day as this patent application: U.S. patent application Ser. No. 15/395,893, (now U.S. Pat. No. 10,110,802, titled "Gaze Heat Map," and filed Dec. 30, 2016; U.S. patent application Ser. No. 15/395,856, (now U.S. Pat. No. 10,121,337, titled "Gaze Controlled Bitrate," filed Dec. 30, 2016; and U.S. patent application Ser. No. 15/395,790, (now U.S. Pat. No. 10,123,020, titled "Block Level Frame Rate Control Based on Gaze," filed Dec. 30, 2016.

The terms "comprises" and "comprising" specify the presence of stated features, integers, steps or components but does not preclude the presence or addition of one or more other features, integers, steps, components or groups thereof. The word "exemplary" is used to mean "serving as an example, instance, or illustration" of more than one example. Any embodiment described herein as "exemplary" does not necessarily imply it to be preferred or advantageous over other embodiments.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

The invention claimed is:

1. A method for monitoring video data based on gaze sensing, comprising:
receiving a video stream generated by a camera;
presenting the received video stream on a display;
receiving a notification signal triggered by an event;
determining that the video stream is associated with the notification signal;
determining a gaze point located on the display of an operator viewing the display;
determining at least one parameter associated with the gaze point located on the display; and
controlling a state of an alarm associated with the notification signal based upon the at least one parameter associated with the gaze point on the located on the display,
wherein controlling the state of the alarm includes masking the alarm by preventing the alarm from activating based upon the at least one parameter associated with the gaze point located on the display.

2. The method of claim 1, wherein receiving a notification signal triggered by an event further comprises:
receiving the notification signal from a sensor that is independent from the camera, wherein the sensor includes at least one of a proximity sensor, an intrusion sensor, a smoke sensor, a heat sensor, a pressure sensor, a motion sensor, a radar sensor, or a radiation sensor.

3. The method of claim 1, wherein receiving a notification signal triggered by an event further comprises:
detecting an object in the received video stream to determine whether to generate the notification based on the event, wherein the event includes at least one of movement of the object, the object entering a field of view of the camera, an object leaving the field of view of the camera, recognizing that the object belongs to a particular class of physical objects, or recognizing that the object is a face of a particular person.

4. The method of claim 3, further comprising:
determining that the gaze point located on the display tracks the object in the video stream for a period of time exceeding a predetermined threshold.

5. The method of claim 1, wherein determining at least one parameter associated with the gaze point located on the display further comprises:
determining that a location of the gaze point on the display coincides with the presented video stream for a period of time.

6. The method of claim 5, wherein controlling a state of an alarm associated with the notification signal further comprises deactivating a currently active alarm.

7. The method of claim 5, wherein controlling the state of the alarm associated with the notification signal further comprises automatically acknowledging the alarm on behalf of the operator.

8. The method of claim 5, wherein controlling the state of the alarm associated with the notification signal further comprises changing a visual presentation or an audio presentation of the alarm to be less conspicuous.

9. The method of claim 5, further comprising:
initiating automatically a recording of the received video stream in response to determining that a location of the gaze point on the display coincides with the presented video stream for a period of time.

10. The method of claim 9, wherein receiving a notification signal triggered by an event further comprises:
detecting an object in the received video stream to determine whether to generate the notification based on the event, wherein the event includes at least one of movement of the object, the object entering a field of view of the camera, an object leaving the field of view of the camera, recognizing that the object belongs to a particular class of physical objects, or recognizing that the object is a face of a particular person; and determining that the gaze point located on the display tracks the object in the video stream for a period of time exceeding a predetermined threshold.

11. The method of claim 1, wherein masking the alarm by preventing the alarm from activating based upon the at least one parameter associated with the gaze point located on the display includes:
preventing the alarm from generating a sound or a visual indication based upon the at least one parameter associated with the gaze point located on the display.

12. A system for monitoring video data based on gaze sensing, comprising:
a receiver to receive a video stream generated by a camera and to receive a notification signal triggered by an event;
a display to present the received video stream on the display;
a processor to determine that the video stream is associated with the notification signal,
wherein the processor is configured to receive, from an eye tracker configured to detect a gaze point located on the display of an operator viewing the display, at least one parameter associated with the gaze point located on the display,
wherein the processor is further configured to control a state of an alarm associated with the notification signal based upon the at least one parameter associated with the gaze point located on the display, and
wherein the processor is configured to control the state of the alarm by masking the alarm by preventing the alarm from activating based upon the at least one parameter associated with the gaze point located on the display.

13. The system of claim 12, wherein the notification signal was generated by a sensor that is independent from the camera, wherein the system includes at least one of a proximity sensor, an intrusion sensor, a smoke sensor, a heat sensor, a pressure sensor, a motion sensor, a radar sensor, or a radiation sensor.

14. The system of claim 12, further comprising:
the camera, wherein the camera is configured to detect an object in the received video stream to determine whether to generate the notification based on the event, wherein the event includes at least one of movement of the object, the object entering a field of view of the camera, an object leaving the field of view of the camera, recognizing that the object belongs to a particular class of physical objects, or recognizing that the object is a face of a particular person.

15. The system of claim 14, further comprising:
the eye tracker, wherein the eye tracker is configured to determine that the gaze point located on the display tracks the object in the video stream for a period of time exceeding a predetermined threshold.

16. The system of claim 12, further comprising:
the eye tracker, wherein the eye tracker is configured to determine that a location of the gaze point on the display coincides with the presented video stream for a period of time.

17. The system of claim 16, wherein the processor is configured to control the state of the alarm by deactivating a currently active alarm.

18. The system of claim 16, wherein the processor is configured to control the state of the alarm by automatically acknowledging the alarm on behalf of the operator.

19. The system of claim 16, wherein the processor is configured to control the state of the alarm by changing a visual presentation or an audio presentation of the alarm to be less conspicuous.

20. The system of claim 16, wherein the processor is configured to initiate an automatic recording of the received video stream in response to determining that the location of the gaze point on the display coincides with the presented video stream for a period of time.

21. The system of claim 20, further comprising:
the camera, wherein the camera is configured to detect an object in the received video stream to determine whether to generate the notification based on the event, wherein the event includes at least one of movement of the object, the object entering a field of view of the camera, an object leaving the field of view of the camera, recognizing that the object belongs to a particular class of physical objects, or recognizing that the object is a face of a particular person; and
the eye tracker, wherein the eye tracker is configured to determine that the gaze point located on the display tracks the object in the video stream for a period of time exceeding a predetermined threshold.

22. The system of claim 12, wherein the processor is configured to control the state of the alarm by masking the alarm by preventing the alarm from generating a sound or a visual indication based upon the at least one parameter associated with the gaze point located on the display.

* * * * *